United States Patent
Chang et al.

(10) Patent No.: US 10,608,864 B2
(45) Date of Patent: Mar. 31, 2020

(54) METHOD OF ESTABLISHING PAID CONNECTION USING SCREEN MIRRORING APPLICATION BETWEEN MULTI-PLATFORMS

(71) Applicant: BARCO LIMITED, New Taipei (TW)

(72) Inventors: Kuo-Lung Chang, Taipei (TW);
Hsing-Yung Wang, New Taipei (TW);
Meng-Chung Hung, New Taipei (TW);
Kuan-Yu Chou, New Taipei (TW);
Jr-Rong Fan, New Taipei (TW);
Shih-Ping Liu, New Taipei (TW);
Li-Ger Chen, New Taipei (TW)

(73) Assignee: BARCO LIMITED, New Taipei (TW)

( * ) Notice: Subject to any disclaimer, the term of this patent is extended or adjusted under 35 U.S.C. 154(b) by 225 days.

(21) Appl. No.: 15/594,245

(22) Filed: May 12, 2017

(65) Prior Publication Data
US 2017/0250830 A1 Aug. 31, 2017

Related U.S. Application Data

(63) Continuation-in-part of application No. 14/022,221, filed on Sep. 10, 2013, now abandoned, which is a
(Continued)

(51) Int. Cl.
*H04L 29/08* (2006.01)
*H04L 12/14* (2006.01)
(Continued)

(52) U.S. Cl.
CPC ........ *H04L 29/0854* (2013.01); *G06F 3/1454* (2013.01); *H04L 12/14* (2013.01);
(Continued)

(58) Field of Classification Search
None
See application file for complete search history.

(56) References Cited

U.S. PATENT DOCUMENTS 7,577,704 B1 * 8/2009 Hegde .................... G06Q 10/10
709/205
7,949,758 B2 * 5/2011 Kaler ..................... G06Q 40/04
705/1.1
(Continued)

*Primary Examiner* — Lance Leonard Barry
(74) *Attorney, Agent, or Firm* — Chun-Ming Shih; HDLS IPR Services

(57) ABSTRACT

A method of establishing a paid connection between multi-platforms, where a transmitting end application is installed in a transmitting end apparatus of a sharing source and a receiving end application is installed in a receiving end apparatus of a sharing target. When establishing a connection, the transmitting end application/receiving end application confirms whether a unique ID of the receiving end apparatus/transmitting end apparatus exists in an exception list, and confirms whether the receiving end application/transmitting end apparatus makes payment based on an operating system used by the transmitting end apparatus/receiving end application, in order to determine establishing a limited or an unlimited connection between the transmitting end apparatus and the receiving end apparatus. Thus, the method assures that either the transmitting end application or the receiving end application is a paid version, a user complies with an application license agreement by using the exception list and the right of application developers is protected.

16 Claims, 11 Drawing Sheets

Related U.S. Application Data continuation-in-part of application No. 13/217,217, filed on Aug. 24, 2011, now Pat. No. 8,560,704.

(51) Int. Cl.
*H04L 29/06* (2006.01)
*G06F 3/14* (2006.01)

(52) U.S. Cl.
CPC ...... *H04L 12/1403* (2013.01); *H04L 12/1485* (2013.01); *H04L 12/1492* (2013.01); *H04L 12/1496* (2013.01); *H04L 65/1069* (2013.01); *H04L 67/1095* (2013.01)

(56) References Cited

U.S. PATENT DOCUMENTS

| | | | | |
|---|---|---|---|---|
| 2002/0173977 A1* | 11/2002 | Dutta | ............... | G06Q 20/127 705/400 |
| 2004/0151192 A1* | 8/2004 | Trossen | ............... | H04W 88/16 370/401 |
| 2007/0189520 A1* | 8/2007 | Altberg | ............... | G06Q 30/02 380/30 |
| 2008/0010153 A1* | 1/2008 | Pugh-O'Connor | .... | G06Q 20/10 705/14.15 |
| 2008/0127306 A1* | 5/2008 | Blumfield | ............ | H04L 63/1441 726/3 |
| 2008/0172483 A1* | 7/2008 | Mickeleit | ............ | H04L 51/38 709/223 |
| 2008/0192733 A1* | 8/2008 | Song | ............... | H04L 65/1016 370/352 |
| 2008/0242421 A1* | 10/2008 | Geisner | ............ | A63F 13/792 463/42 |
| 2010/0268694 A1* | 10/2010 | Denoue | ............ | G06F 16/954 707/693 |
| 2012/0221955 A1* | 8/2012 | Raleigh | ............ | H04M 15/00 715/736 |
| 2015/0234575 A1* | 8/2015 | Suk | ............... | G06F 3/04817 715/740 |
| 2015/0373389 A1* | 12/2015 | Liao | ............... | H04N 21/2743 348/569 |
| 2017/0235435 A1* | 8/2017 | Sohn | ............... | G06F 3/0481 715/738 |
| 2017/0311368 A1* | 10/2017 | Kandur Raja | ........ | H04W 76/14 |

* cited by examiner

METHOD OF ESTABLISHING PAID CONNECTION USING SCREEN MIRRORING APPLICATION BETWEEN MULTI-PLATFORMS

CROSS REFERENCES RELATED TO THE APPLICATIONS

This application is a continuation-in-part application of U.S. patent application Ser. No. 14/022,221 filed on Sep. 10, 2013, now abandoned, which is a continuation-in-part application of U.S. patent application Ser. No. 13/217,217, filed on Aug. 24, 2011, now U.S. Pat. No. 8,560,704.

BACKGROUND OF THE INVENTION

Field of the Invention

The present invention relates to a method for establishing a connection between multi-platforms, in particular, the present invention relates to a method of establishing a paid connection between multi-platforms.

Description of Prior Art

In recent years, electronic industries grow rapidly and various electronic devices are widely used in everyday life. Users use electronic devices for entertaining purposes, such as displaying films and executing games. In addition, work efficiency is significantly improved with the convenient functions delivered by electronic devices.

The functions provided by electronic devices rely on the capabilities of hardware and associated software. For example, users play movies with film playing application on computers. In general, users purchase paid application or download free application depending on the marketing strategies of application developers. Nonetheless, when application is executed on a plurality of electronic devices, the charging mechanism is required to redesign by the application developer.

In an example of screen mirroring application, a screen mirroring application transmits multimedia data displayed on the screen of a first electronic device to the screen of a second electronic device via network systems. Under the circumstance, it is required to install a transmitting end screen mirroring application (referred in the following as transmitting end application) on the first electronic device for transmitting data, and it is required to install a receiving end screen mirroring application (referred in the following as receiving end application) on the second electronic device for receiving and processing data.

In view of application developers, when the above transmitting end applications and receiving end applications are free to download by users, it is convenient to use but difficult to collect payments. Accordingly, the interests of application developers are at risk. However, when purchases are required at both transmitting and receiving end applications, users have to perform the paying procedures twice, which is inconvenient. Thus, application developers need to implement a mechanism to charge at either transmitting end or receiving end application, while the other transmitting or receiving end application can be used freely without purchase.

For display device manufacturers (for example, smart television, projector or other devices supporting screen mirroring function), a pre-installed version of receiving end application is preferred at production stage. Thus, after purchasing the display device, users can make use of screen mirroring function by installing a separate transmitting application on another device, for example smart phone, computer, or other devices supporting screen mirroring function. However, a problem arises between application developer and display device manufacturer when it comes to royalty collection.

Manufacturers of display devices have options to install a free or paid version of screen mirroring receiving application. If a free version is installed, users are required to purchase and install paid screen mirroring applications in their electronic devices for performing screen projection with the display devices. If a paid version is installed, cost of manufacturers increases due to extra software license fee, and users can install a free version of screen mirroring transmitting application with the display device. Taking all that into consideration, manufacturers of display devices and application developers need to negotiate and resolve reasonable royalties of the application, and scope of functionalities supported once a royalty is dealt. (for example, which platforms are supported by screen mirroring applications or which document content is supported by the screen mirroring applications).

When a display device is installed with a free screen mirroring receiving application, users have to use a paid screen mirroring transmitting application for establishing a connection. Otherwise, application developers cannot collect any payments. When a display device is installed with a paid screen mirroring receiving application, the users are allowed to use a free screen mirroring application for establishing a connection. In addition, even if a display device is installed with a paid screen mirroring application and users use a free screen mirroring application for establishing a connection, it is still required to determine if the function of screen mirroring application is supported according to payments dealt between application developer and display device manufacturer. Those functions include but not restrict to system platforms used by the screen mirroring source, or document content of the screen projection.

SUMMARY OF THE INVENTION

It is an objective of the present invention to provide a method of establishing a paid connection using a screen mirroring application between multi-platforms. The method assures that either the transmitting end application or the receiving end application is a paid version, a user complies with an application license agreement and the right of application developers is protected.

In order to achieve the aforementioned objective, when a connection is established, the transmitting end application confirms if a unique ID of the receiving end apparatus exists in an exception list recorded by transmitting end application, and confirms if the receiving end application makes payment based on an operating system used by the transmitting end apparatus in order to determine establishing a limited connection or an unlimited connection between the transmitting end apparatus and the receiving end apparatus.

A screen mirroring application is used for transmitting the screen data of a transmitting end apparatus (for example a mobile phone) to a receiving end apparatus (for example a smart television), and the screen data of a transmitting end apparatus is displayed on the screen of the receiving end apparatus for performing the function similar to screen mirroring via a network system. In contrast with the related art, the advantage of the present invention is that application developers setup operating systems supported by an application in advance according to a product license agreement signed by a user. When two apparatuses are going to establish a connection and the operating systems used by the apparatuses are supported by the application, the two apparatuses establish an unlimited connection. If the user violates the product license agreement afterwards, the application developers sets up an exception list via an application update to amend the connection authority of the application. Thus, users are required to follow the product license agreement.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
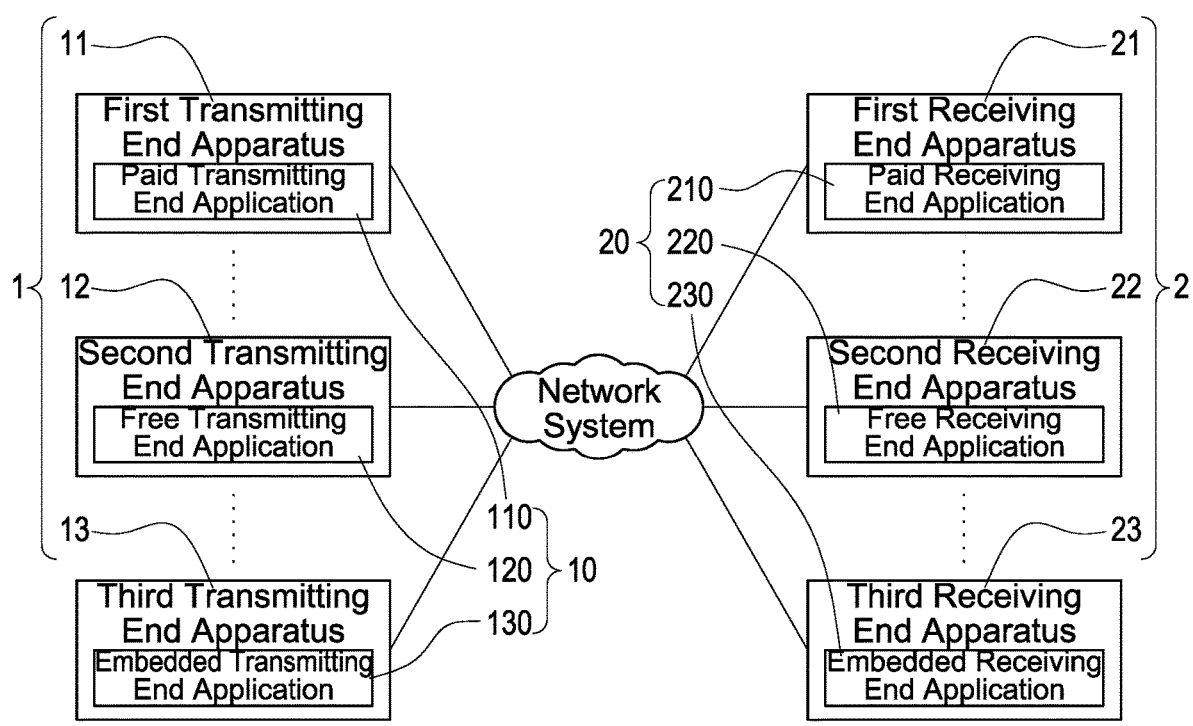
FIG. 1 is a system block diagram of a preferred embodiment of the present invention.

FIG. 1 is a system block diagram of a preferred embodiment of the present invention. According to the present invention, the method of establishing a paid connection using a screen mirroring application between multi-platforms is used between at least a transmitting end apparatus 1 and at least a receiving end apparatus 2. The transmitting end apparatus 1 and the receiving end apparatus 2 are both installed with a screen mirroring application. The screen mirroring applications are used for performing screen mirroring of the transmitting end apparatus 1 on the screen of the receiving end apparatus 2 via network systems. The differences of the screen mirroring applications are that the transmitting end apparatus 1 is installed with a transmitting end application 10, and the receiving end apparatus 2 is installed a receiving end application 20.

As shown of FIG. 1, the transmitting end application 10 can be a paid transmitting end application 110 or a free transmitting end application 120. Users purchase from an application developer and install the paid transmitting end application 110 in a first transmitting end apparatus 11. Further, users may download and install the free transmitting end application 120 in a second transmitting end apparatus 12.

The receiving end application 20 can be a paid receiving end application 210 and a free receiving end application 220. Users purchase from an application developer and install the paid receiving end application 210 in a first receiving end apparatus 21. Further, users download and install the free receiving end application 220 in a second receiving end apparatus 22. It should be noted that, the receiving end apparatus 2 usually has a display screen larger than the screen of the transmitting end apparatus 1, for example, a smart television or large screen notebook computer. In addition, the receiving end application 20 can be an embedded receiving end application 230. The receiving end apparatus 2, for example, a third receiving end apparatus 23 is installed with the embedded receiving end application 230 by default in factories. Thus, users do not need to purchase and install the receiving end application 20 separately which is more convenient to users.

However, in another embodiment, the size of the display screen on the receiving end apparatus 2 may be smaller than the size of the display screen on the transmitting end apparatus 1. For example, the transmitting end apparatus 1 is a smart TV. As the example shown in FIG. 3, the third transmitting end apparatus 13 is installed with an embedded transmitting end application 130 by default in factories. The receiving end apparatus 2 is a smart phone or a tablet. The smart TV transmits the content of television shows to the smart phone or the tablet to display via the connection and mirroring function established between the transmitting end application 10 and the receiving end application 20. Thus it is made convenient to users to watch television shows anywhere.

Figure 2:
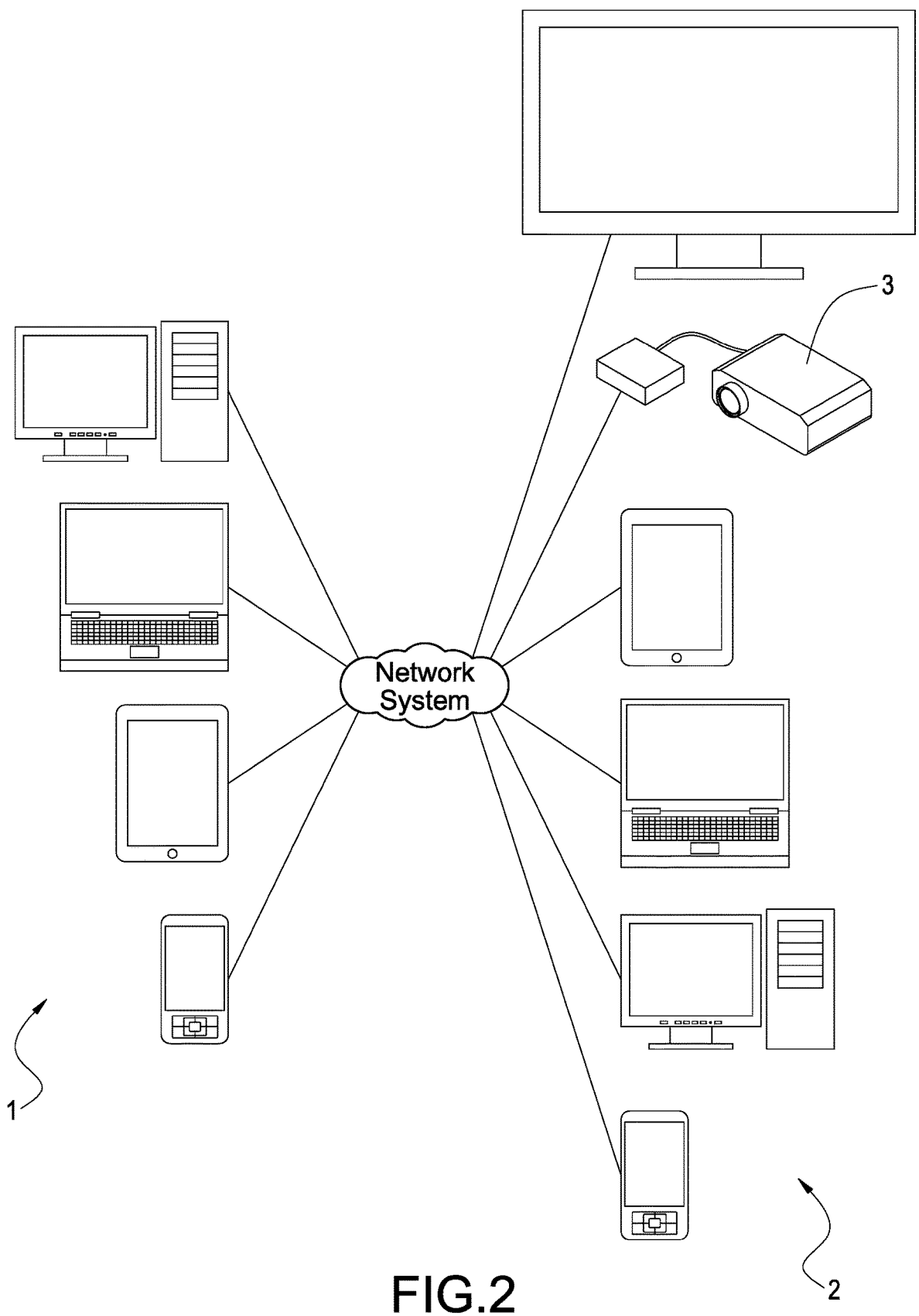
FIG. 2 is a system architecture diagram of a preferred embodiment of the present invention.

FIG. 2 is a system architecture diagram of a preferred embodiment of the present invention. In general, the transmitting end apparatus 1 can be a Personal Computer (PC), a Notebook Computer, a Tablet, a Smart Phone, Smart TV, etc. and are not limited thereto. The transmitting end apparatus 1 uses an internal controller for executing multimedia files, for example, playing movies or executing games, opening a document (for example an Office document or a PDF document) or other applications (for example activating camera lens), and transmitting the screen of the transmitting end apparatus 1 via the screen mirroring application installed.

The receiving end apparatus 2 can be a Smart Computing Device, Personal Computer (PC), a Notebook Computer, a Tablet, a Smart Phone, etc. The screen mirroring application is installed for receiving the data transmitted by the transmitting end apparatus 1. The transmitted data is decompressed, decoded and displayed on the screen. It should be noted that if users transmit the screen of the transmitting end apparatus 1 to an apparatus which is incapable of executing application automatically, for example, a projector 3. The receiving end apparatus 2 further can be an expanded device which is electrically coupled to the projector 3. The receiving end application 20 is installed and executed in the expanded device, and the expanded device receives data from the transmitting end apparatus 1. The received data is decompressed and decoded. The images and sounds generated by the data decompression and decoding are transmitted to the projector 3 for performing screen mirroring.

The advantages of the present invention are that if a screen mirroring application installed in the transmitting end apparatus 1 is a paid version, i.e. the paid transmitting end application 110, the transmitting end apparatus 1 establish an unlimited connection with any receiving end apparatus 2 installed with the receiving end application 20 and performs screen mirroring. For example, the first transmitting end apparatus 11 in FIG. 1 establishes an unlimited connection with the first receiving end apparatus 21, the second receiving end apparatus 22, and the third receiving end apparatus 23. Similarly, if the screen mirroring application installed in the receiving end apparatus 2 is a paid version (for example the paid receiving end application 210), then the receiving end apparatus 2 is allowed to establish an unlimited connection with any transmitting end apparatus 1 installed with the transmitting end application 10 and perform screen mirroring. For example, the receiving end apparatus 21 in the FIG. 1 is allowed to freely establish a connection with the first transmitting end apparatus 11, the second transmitting end apparatus 12 and the third transmitting end apparatus 13 for receiving and displaying the screen image of the transmitting end apparatuses 11, 12, and 13.

If the screen mirroring application installed in the transmitting end apparatus 1 is a free version, i.e., the free transmitting end application 120, the free transmitting end application 120 has to determine the version of the receiving end application 20 of the sharing target before a connection is established. If the receiving end apparatus 2 of the sharing target is installed with the free receiving end application 220, the transmitting end apparatus 1 and the receiving end apparatus 2 may only establish a limited connection (detailed in the following). On the other hand, if the receiving end apparatus 2 of the sharing target is installed with the paid receiving end application 210, the transmitting end apparatus 1 and the receiving end apparatus 2 may establish an unlimited connection. In addition, screen mirroring is performed after the connection is successfully connected. In the embodiment, the paid content of the paid receiving end application 210 is not associated with the operating system used by the transmitting end apparatus 1. As long as the paid receiving end application 210 is installed in the receiving end application 2, the transmitting end apparatus 1 and the receiving end apparatus 2 may establish an unlimited connection.

The above determining mechanism can be executed by the receiving end application 20 as well. For example, if the screen mirroring application installed in the receiving end apparatus 2 is the free receiving end application 220, then the free receiving end application 220 first determines the version of the transmitting end application 10 of the sharing source when the transmitting end apparatus 1 requests to make a connection. If the transmitting end apparatus 1 of the sharing source is installed with the free transmitting end application 120, then the receiving end apparatus 2 and the transmitting end apparatus 1 may only establish a limited connection. On the other hand, if the transmitting end apparatus 1 of the sharing source is installed with the paid transmitting end application 110, then the receiving end apparatus 2 and the transmitting end apparatus 1 may establish an unlimited connection and perform screen mirroring after the connection is established successfully. Similarly, in the embodiment, the paid content of the paid transmitting end application 210 is not associated with the operating system used by the receiving end apparatus 2. As long as the paid transmitting end application 210 is installed in the transmitting end apparatus 1, the transmitting end apparatus 1 and the receiving end apparatus 2 may establish an unlimited connection.

In other words, when the transmitting end apparatus 1 and the receiving end apparatus 2 establish a connection, the transmitting end application 10 in the transmitting end apparatus 1 can be used for determining which types of connections are allowed to establish (limited or unlimited); also, the receiving end application 20 in the receiving end apparatus 2 can be used for determining which types of connections are allowed to establish, and are not limited thereto. Among which, if the application used for the determination is a paid version (for example the paid transmitting end application 110 or the paid receiving end application 210), then an unlimited connection may be directly established without the determining mechanism of the application.

It should be noted that an application developer decides which operating systems used by the transmitting end apparatus 1 (or the receiving end apparatus 2) are supported by the paid receiving end application 210 (or the paid transmitting end application 110) according to the pricing of the paid receiving end application 210 (or the paid transmitting end application 110). As shown in Table A, a supporting schematic diagram of the transmitting end application 10/the receiving end application 20 is illustrated.

TABLE A

| Paid receiving end application/paid transmitting end application | Operating system | | Pricing |
| --- | --- | --- | --- |
| | Not supporting | Supporting | |
| A | | Windows only | 0.99 |
| B | Android/iOS/BB | Windows/Mac OS | 1.99 |
| C | Android/Windows/BB | Mac OS/iOS | 1.99 |
| D | None | ALL | 3.99 |
| E | All | None | Free |

In the example of using an paid receiving end application 210, if the price of the paid receiving end application 210 is lower, for example, the retail price of an A application is USD$0.99 in Table A, an application developer configures an internal flag of the paid receiving end application 210 according to low retail price of the A application to define that the A application only supports the transmitting end apparatus 1 that uses a Windows platform. When the transmitting end apparatus 1 using a Mac OS platform is going to establish a connection with the receiving end apparatus 2 installed with the A application, the free transmitting end application 120 has to confirm that the A application is a paid version, then the free transmitting end application 120 further determines if the A application supports a Mac OS platform. As shown in Table A, although the A application is the paid transmitting end application 210, the transmitting end apparatus 1 using a Mac OS platform cannot establish an unlimited connection with the A application because the A application does not be paid based on a Mac OS platform and accordingly does not support a Mac OS platform used by the transmitting end apparatus 1.

The aforementioned pricing is the retail price of each application or the royalties of product licenses agreed by manufactures and application developers and the scope is not limited thereto. However, Table A is a preferred embodiment of the present invention and the scope of the invention is not limited thereto.

As the B application and the C application shown in Table A, when the retail price is higher, the application developer configures that the B application and the C application support more operating systems. Take examples shown in Table A, the B application supports the transmitting end apparatus 1 that uses a Windows platform and a Mac OS platform but does not support the transmitting end apparatus 1 that uses an Android platform, an iOS platform and a Black Berry platform. For another example, the C application supports the transmitting end apparatus 1 that uses a Mac OS and an iOS platform but does not support a transmitting end apparatus 1 that uses a Windows platform, an Android platform and a Black Berry platform. In details, an internal flag of the receiving end application 20 is configured to define which operating systems to support, but the scope is not limited thereto (for example, if manufacturers pay based on a specific operating system, the application developer sets up the internal flag of the receiving end application 20 to enable the receiving end application 20 to support the specific operating system).

It should be note that in an embodiment according to the present invention, the free transmitting end application 120 is used to determine which operating systems are supported by the paid receiving end application 210, or the free receiving end application 220 may be used to determine which operating systems are supported by the paid transmitting end application 110 as well, but the scope is not limited thereto.

As mentioned above, the receiving end application 20 can be an embedded receiving end application 230. For example, an embedded receiving end application 230 is installed in a receiving end apparatus 2 (for example, a smart television, a notebook computer or a setup box) during manufacturing process in the factories. Manufactures of televisions, computers and setup boxes decide which operating systems are supported by the embedded receiving end application 230 according to marketing strategies and then sign corresponding products license agreements with and pay corresponding royalties to application developers. Thus, the application developers set up the embedded receiving end application 230 in advance so as to enable the embedded receiving end application 230 to support one or more operating systems complying with the content of the product license agreement. Consequently, the free transmitting end application 120 determines according to that the manufacturers paid based on one or more operating systems.

Similarly, the transmitting end application 10 can be the embedded transmitting end application 130, the manufacturers decide which operating systems are supported by the embedded transmitting end application 130, and then the manufacturers sign corresponding products license agreements with and pay corresponding royalties to application developers same as the process mentioned above.

In the example of using the embedded receiving end application 230, the television manufacturers sign product license agreements with or pay royalties to the application developers, and the application developers configure the embedded receiving end application 230 in advance in order to support all the transmitting end apparatus 1 using any operating system (for example, the D application shown in Table A). Consumers purchase smart televisions and are allowed to establish an unlimited connection by the transmitting end apparatus 1 using any platform and perform screen mirroring for displaying the screen image on the smart televisions.

On the other hand, if the manufacturers do not sign product license agreements with or pay royalties to the application developers, the application developers configure the embedded receiving end application 230 to not support the transmitting end apparatus 1 using any operating system (for example, the E application shown in Table A). Under the circumstance, consumers purchase the smart televisions and are required to purchase and install the paid transmitting end application 110 in the transmitting end apparatus 1 so as to establish an unlimited connection with smart televisions.

As mentioned above, the kinds and quantities of operating systems supported by the paid applications (the paid transmitting end application 110 or the paid receiving end application 210) are determined by the product license agreement (and the paid royalties). However, under specific conditions, the manufacturers may amend the content of the license agreement afterwards (such as make extra payments to support more operating systems or stop making royalties when the product license agreements expire). The updates of certain paid applications can be difficult to implement (for example, the paid receiving end applications 210 are firmware of setup boxes or smart televisions). Once the manufacturers amend the content of the authority, the update is a difficult issue to overcome to the application developers.

In order to resolve such issue, the method of the present invention provides an exception list in a free application via updating the free application (such as the free transmitting end application 120 or the free receiving end application 220), and resolve the issue that the setup of the paid applications does not comply with the current status (i.e., does not comply with the content of the product license agreement) via the exception list (details in the following).

Figure 3A:
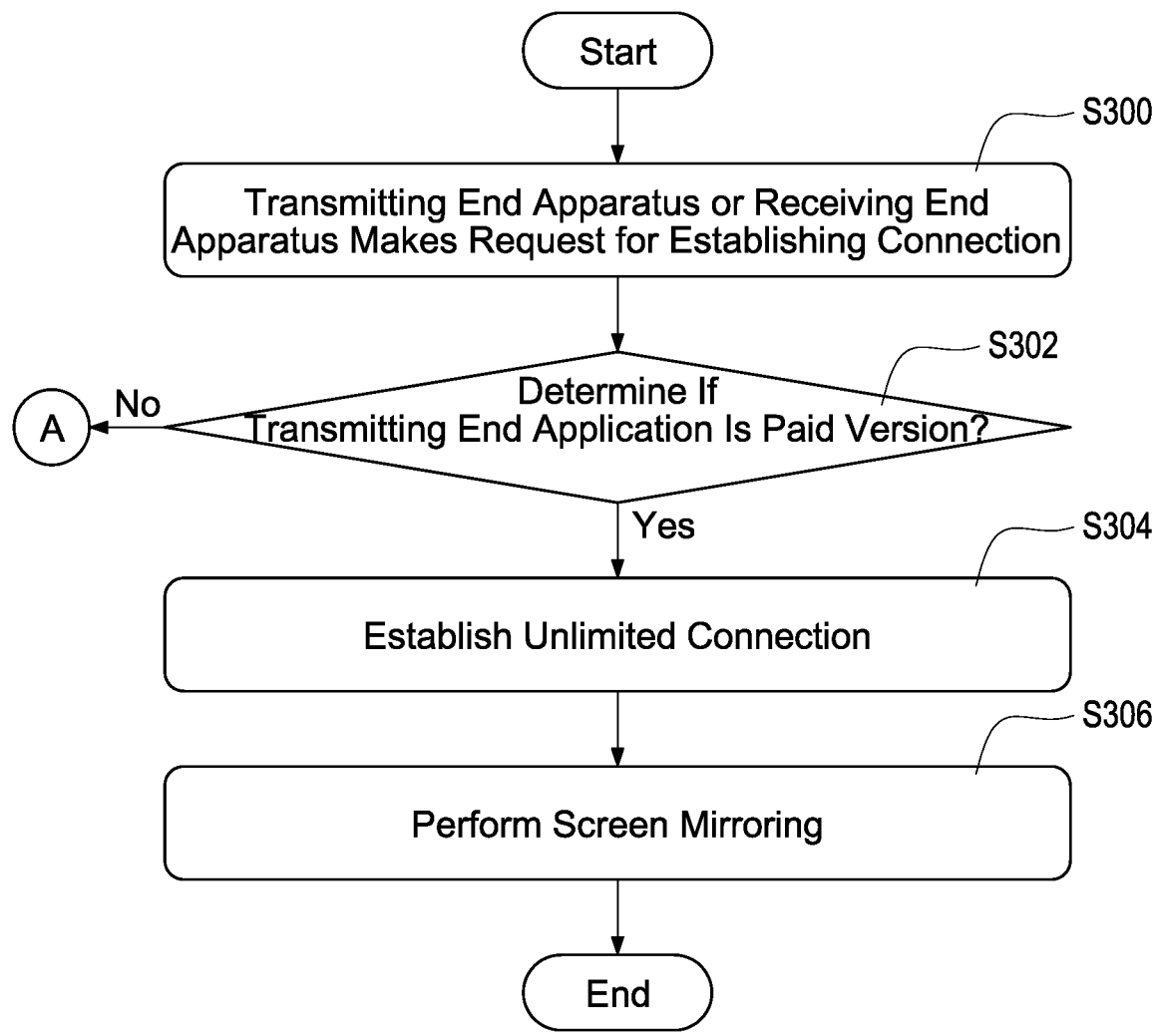
FIG. 3A is a first flow chart of the first preferred embodiment according to the present invention.
Figure 3B:
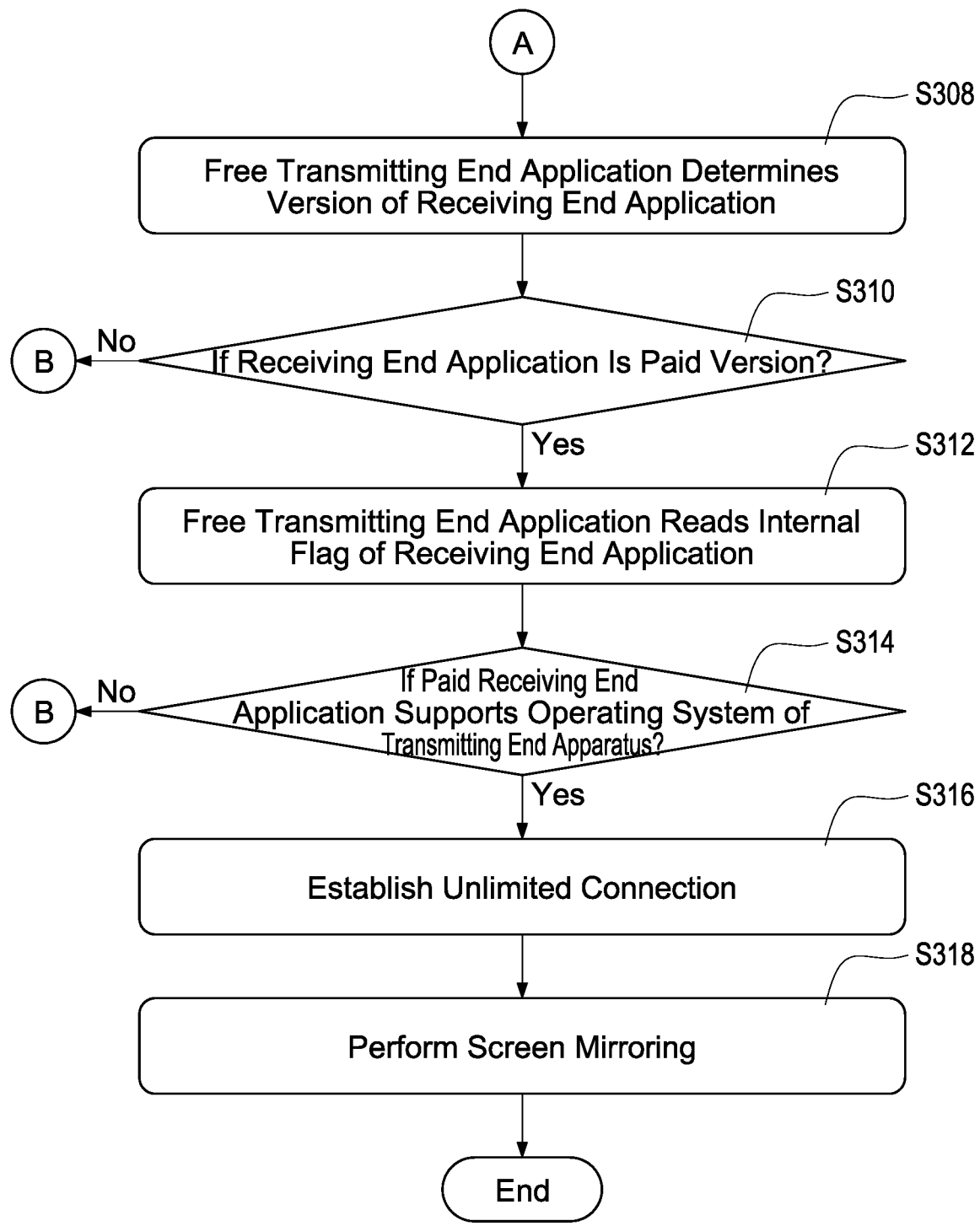
FIG. 3B is a second flow chart of the first preferred embodiment according to the present invention.
Figure 5:
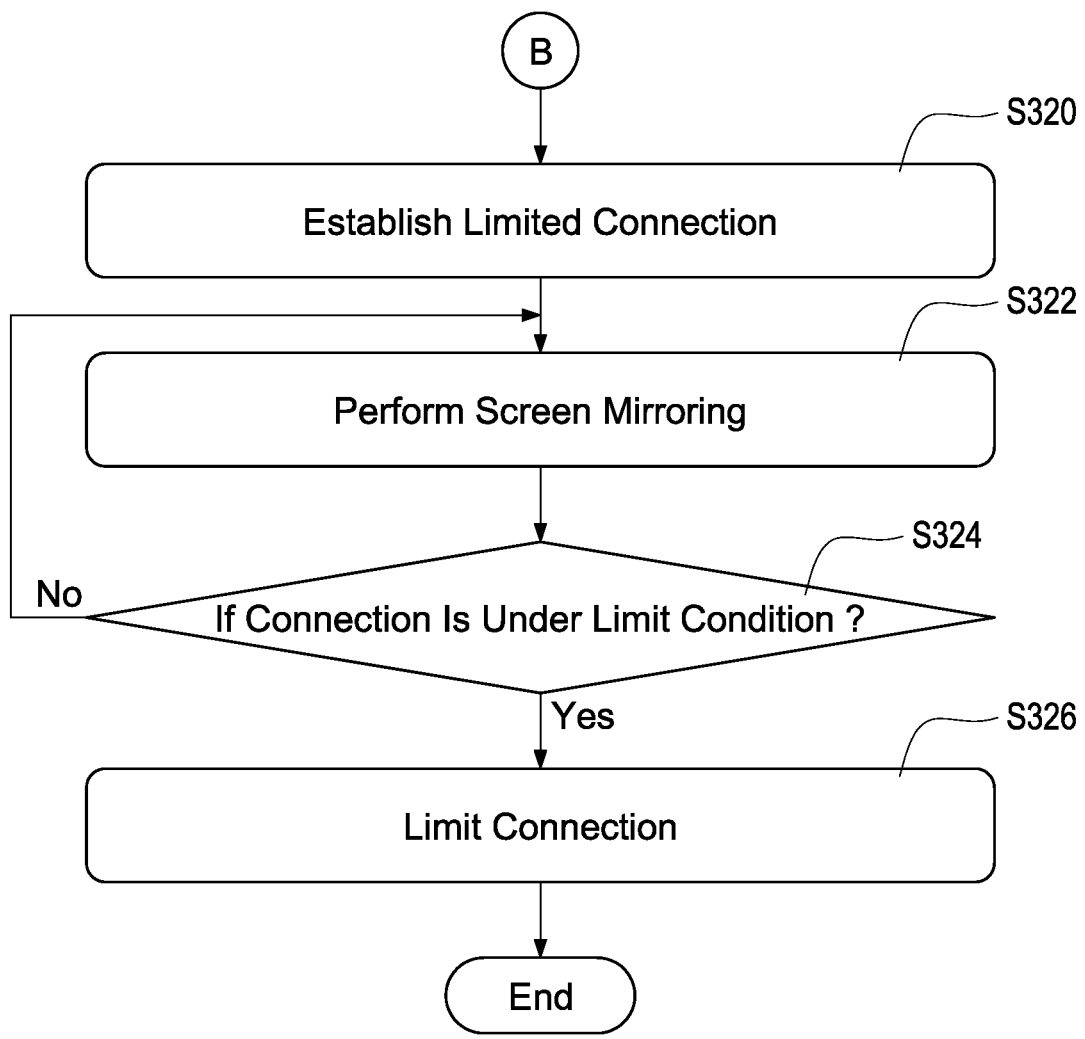
FIG. 5 is a third flow chart of the first preferred embodiment according to the present invention.

FIG. 3A, FIG. 3B and FIG. 5 are a first flow chart, a second flow chart and a third flow chart of a preferred embodiment according to the present invention. Firstly, a request for establishing a connection is made by the transmitting end apparatus 1 or the receiving end apparatus 2 (step S300). The connection request can be made by the transmitting end apparatus 1 or the receiving end apparatus 2, and is not limited thereto. Next, determining if the transmitting end application 10 installed in the transmitting end apparatus 1 is a paid version (step 302). If the transmitting end apparatus 1 is installed with the paid transmitting end application 110, the transmitting end apparatus 1 establish an unlimited connection directly with the receiving end apparatus 2 (step S304). And the transmitting end apparatus 1 and the receiving end apparatus 2 are allowed to perform screen mirroring after the connection is established successfully (step S306).

As shown in FIG. 3, if the transmitting end apparatus 1 is installed with the free transmitting end application 120, the free transmitting end application 120 determines the version of the receiving end application 20 installed in the receiving end apparatus 2 (step S308). After S308, the free transmitting end application 120 determines if the receiving end application 20 is a paid version (step S310). If the receiving end application 20 is a paid version, i.e. the paid receiving end application 210, the free transmitting end application 120 further reads the internal flag in the paid receiving end application 210 (step S312). The flag is used for determining if the paid receiving end application 210 supports the operating system used by the transmitting end application 1 (step S314). If the paid receiving end application 210 supports the operating system used by the transmitting end apparatus 1, the transmitting end apparatus 1 and the receiving end apparatus 2 establish an unlimited connection (step S316), and screen mirroring is performed after a connection is successfully established (step S318).

However, if the free transmitting end application 120, in the step S310, determines that the receiving end application 20 is a free version, or the receiving end application 20 is a paid version but further determines that the paid receiving end application 210 cannot support the operating system of the transmitting end apparatus 1, the method moves to steps shown in FIG. 5.

According to the above status, the transmitting end apparatus 1 and the receiving end apparatus 2 establish a limited connection (step S320), and the screen mirroring is performed after a connection is successfully established, (step S322). Consequently, the free transmitting end application 120 has to determine if the connection is under a limit condition (step S324). For example, the limit condition is a limit of the connection time. When the connection time is up to 5 minutes, the limit condition occurs. The above description is provided as an example and the scope is not limited thereto.

If the connection is not under the limit condition, the transmitting end apparatus 1 and the receiving end apparatus 2 continues to perform screen mirroring. When the connection is under the limit condition, the connection between the apparatus 1 and apparatus 2 is limited (step S326). For example, the connection is forcibly disconnected between the transmitting end apparatus 1 and the receiving end apparatus 2, or a charge reminder message is displayed on the screen of the transmitting end apparatus 1 and/or the receiving end apparatus 2 for reminding users to purchase a paid version application, or reminding users and the and developers to re-sign the product license agreement of the paid receiving end application 210, but the scope of the invention is not limited thereto.

It should be noted that, the above steps are used for assuring at least either the transmitting end apparatus 1 or the receiving end apparatus 2 is an application of paid version. Accordingly, given the transmitting end apparatus 1 or the receiving end apparatus 2 uses a Windows platform, users are not required to provide registration code or perform authorization procedure online when installs an application. Thus, the installing process is made convenient to users.

In the embodiment of FIGS. 3A and 3B, the transmitting end application 10 executes the determining mechanism for establishing a connection, such as determining if the transmitting end application 10 is a paid version, determining if the receiving end application 20 is a paid version, and if the receiving end application 20 supports the operating system used by the transmitting end apparatus 1. However, it should be noted that the above determining mechanism can be executed by the receiving end application 20 in another embodiment.

Figure 4A:
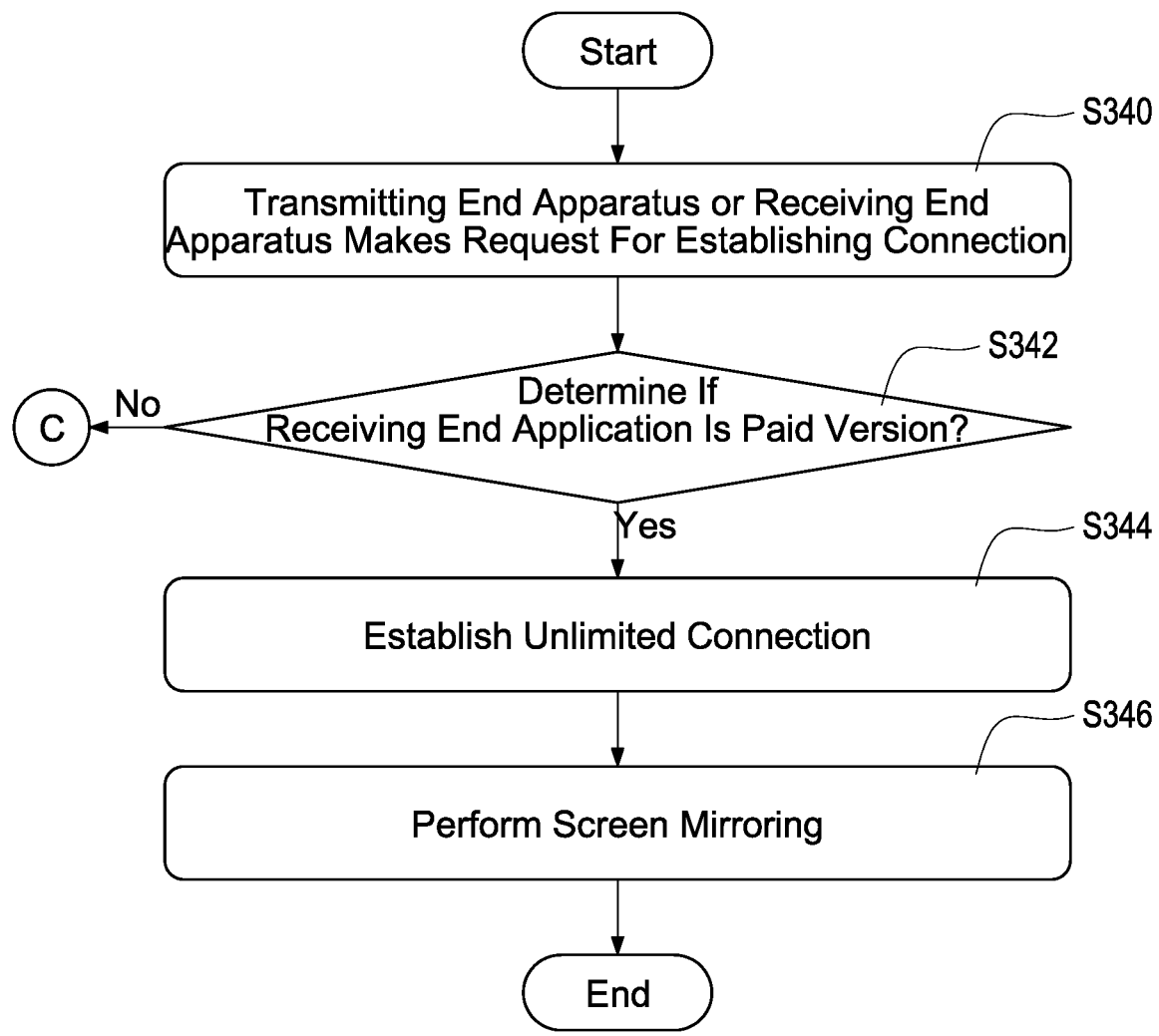
FIG. 4A is a first flow chart of the second preferred embodiment according to the present invention.
Figure 4B:
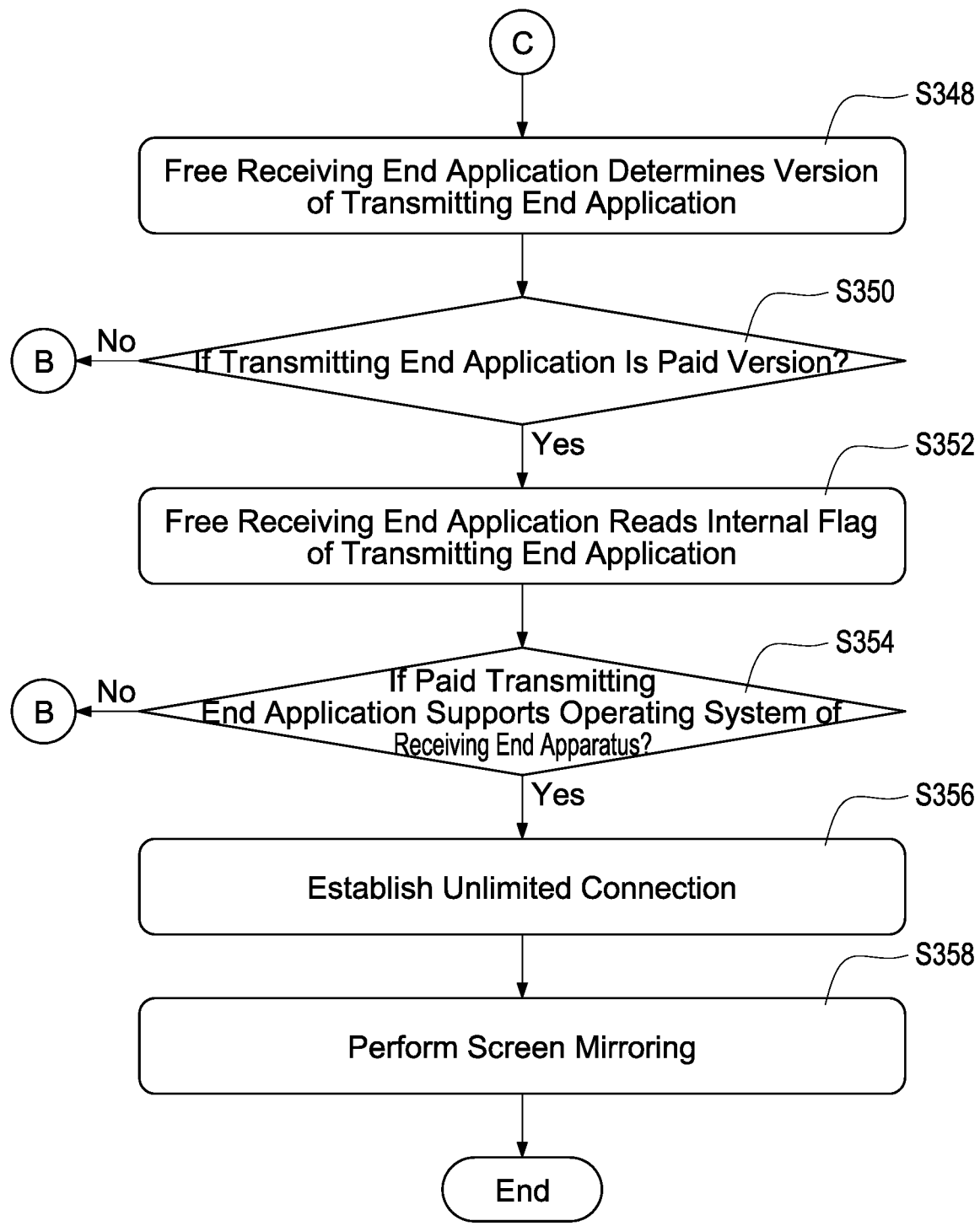
FIG. 4B is a second flow chart of the second preferred embodiment according to the present invention.

FIGS. 4A and 4B are the first flow chart and the second flow chart of the second preferred embodiment according to the present invention. Firstly, a request for establishing a connection is made by the transmitting end apparatus 1 or the receiving end apparatus 2 (step S340). Next, determining if the receiving end application 20 installed in the receiving end apparatus 2 is a paid version (by the receiving end application 20) (step S342). As mentioned in the above embodiment, if the paid receiving end application 210 is installed in the receiving end apparatus 2, the receiving end apparatus 2 directly establish an unlimited connection with the transmitting end apparatus 1 (step S344) and perform screen mirroring after the connection is established (step S346).

In the step S342, if the receiving end application 20 is determined as the free receiving end application 220, as shown in FIG. 4B, the free receiving end application 220 further determines the version of the transmitting end application 10 installed in the transmitting end apparatus 1 (step S348). The free receiving end application 220 determines if the transmitting end application 10 is a paid version (step S350). If the transmitting end application 10 is a paid version, then the free receiving end application 220 further retrieve an internal flag in the paid transmitting end application 110 (step S352), wherein the content of the flag is used for determining if the paid transmitting end application 110 supports the operating system used by the receiving end apparatus 2 (step S354). If the paid transmitting end application 110 supports the operating system used by the receiving end apparatus 2, the receiving end apparatus 2 and the transmitting end apparatus 1 establish an unlimited connection (step S356) and perform screen mirroring after the connection is established (step S358).

However, in the step S350, if the transmitting end application 10 is determined as a free version, or the transmitting end application 10 is determined as a paid version but the paid transmitting end application 110 is determined not supporting the operating system used by the receiving end apparatus 2 in the step S354, the flow moves back to the steps shown in the FIG. 5 as illustrated in the previous embodiment and is not elaborated hereto.

Is should be noted that many integrated applications are popular in recent years and such integrated applications integrate functions of more than one application. Users only buy one application and execute multiple functions. For example, the screen mirroring function of the present invention is integrated with document processing applications, such as Office viewer, PDF viewer, etc. Users install the screen mirroring application in the transmitting end apparatus 1, and use the screen mirroring application to open the designated documents in the transmitting end apparatus 1, such as Office documents or PDF documents, and at the same time mirror the content of the opened documents to display on the screen of the receiving end apparatus 2.

For example, a "WiFi-Doc" application integrates with the functions of the transmitting end application 10, the Office viewer and the PDF viewer. When the application is installed in the transmitting end apparatus 1 and executed, the transmitting end apparatus 1 is allowed to open the Office documents or PDF documents in the transmitting end apparatus 1, mirror the opened Office documents or PDF documents to the receiving end apparatus 2 and display the Office documents or the PDF documents on the screen of the receiving end apparatus 2 after the connection of the transmitting end apparatus 1 and the receiving end apparatus 2 is established.

In the aforementioned embodiment, before the connection is established, the screen mirroring application determines if the transmitting end application 10/the receiving end application 20 supports the operating systems used in the sharing target/sharing source. In the embodiment, before the connection and the mirroring, the screen mirroring application also determines if the transmitting end application 10/the receiving end application 20 supports the document content to mirror. For example, a simple screen mirroring application support mirroring of any document content, or determining which document content are supported to mirror depending on the pricing (or depending on the product license agreement). For example, an integrated application integrated with a screen mirroring application and an Office viewer is able to mirror document content of an Office document, and an integrated application integrated with a screen mirroring application and a PDF viewer is able to mirror document content of a PDF document. However, the aforementioned are preferred embodiments of the present invention and the scope of the invention is not limited thereto.

Figure 6:
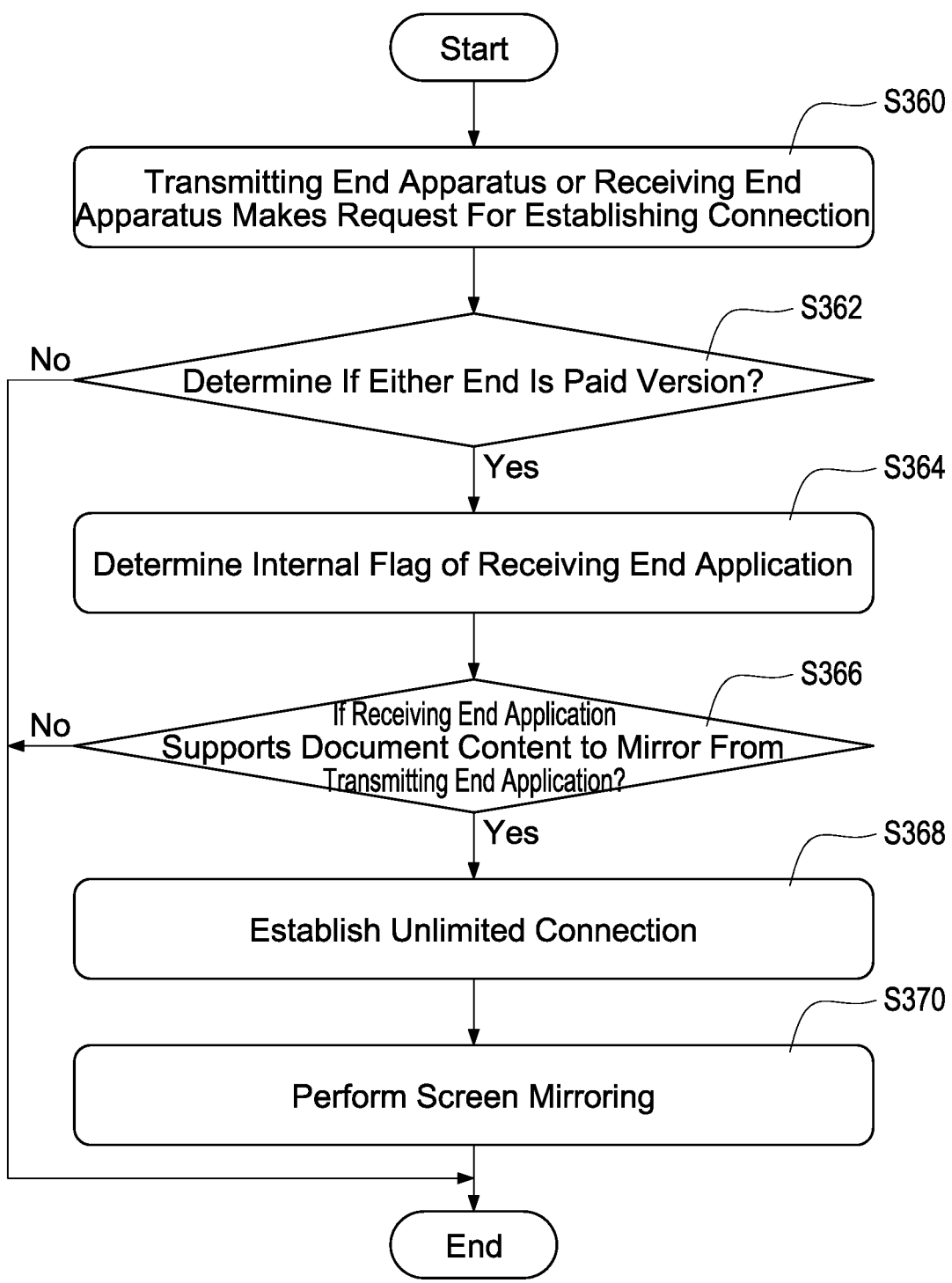
FIG. 6 is a first flow chart of the third preferred embodiment according to the present invention.

FIG. 6 is a first flow chart of the third preferred embodiment according to the present invention. In the embodiment, the transmitting end application 10 installed in the transmitting end apparatus 1 is integrated with functions in addition to the screen mirroring such as functions of an Office viewer, a PDF viewer or other functions (such as a camera function which is able to transfer photos or films taken by the camera to the receiving end apparatus 2 to display the photos or the films), and are not limited thereto. Firstly, a request for establishing a connection is made by the transmitting end apparatus 1 or the receiving end apparatus 2 (step S360). Next, the transmitting end application 10 determines if one of the transmitting end application 10 and the receiving end application 20 is a paid version via the corresponding step of the aforementioned embodiment (step S362). If the transmitting end application 10 and the receiving end application 20 are both free versions, then the transmitting end apparatus 1 and the receiving end apparatus 2 are not able to establish a connection. Or, establishes a limited connection and performs mirroring as mentioned in the embodiment shown in the FIG. 5.

If one of the transmitting end application 10 and the receiving end application 20 is a paid version, then the transmitting end application 10 further determines an internal flag of the receiving end application 20 (step S364), wherein the content of the flag is used for determining if the receiving end application 20 supports the document content to mirror from the transmitting end application 10 (step S366). If the receiving end application 20 does not support the document content to mirror from the transmitting end application 10 (for example document content of an Office document or document content of a PDF document), then the transmitting end apparatus 1 and the receiving end apparatus 2 are not able to establish a connection, or can only establish a limited connection and perform mirroring as mentioned in the embodiment shown in the FIG. 5. On the other hand, if the receiving end application 20 supports mirroring of the document content, then the transmitting end apparatus 1 and the receiving end apparatus 2 establish an unlimited connection (step S368). In addition, performs screen mirroring after the connection is established successfully (step S370), wherein the transmitting end application 10 shares designated document content with the receiving end apparatus 2 and display the designated document content on the screen of the receiving end apparatus 2.

In the embodiment shown in the FIG. 6, the transmitting end application 10 is used for performing the determining mechanism for establishing a connection. However, in another embodiment, the determining mechanism can also be executed by the receiving end application 20.

Figure 7:
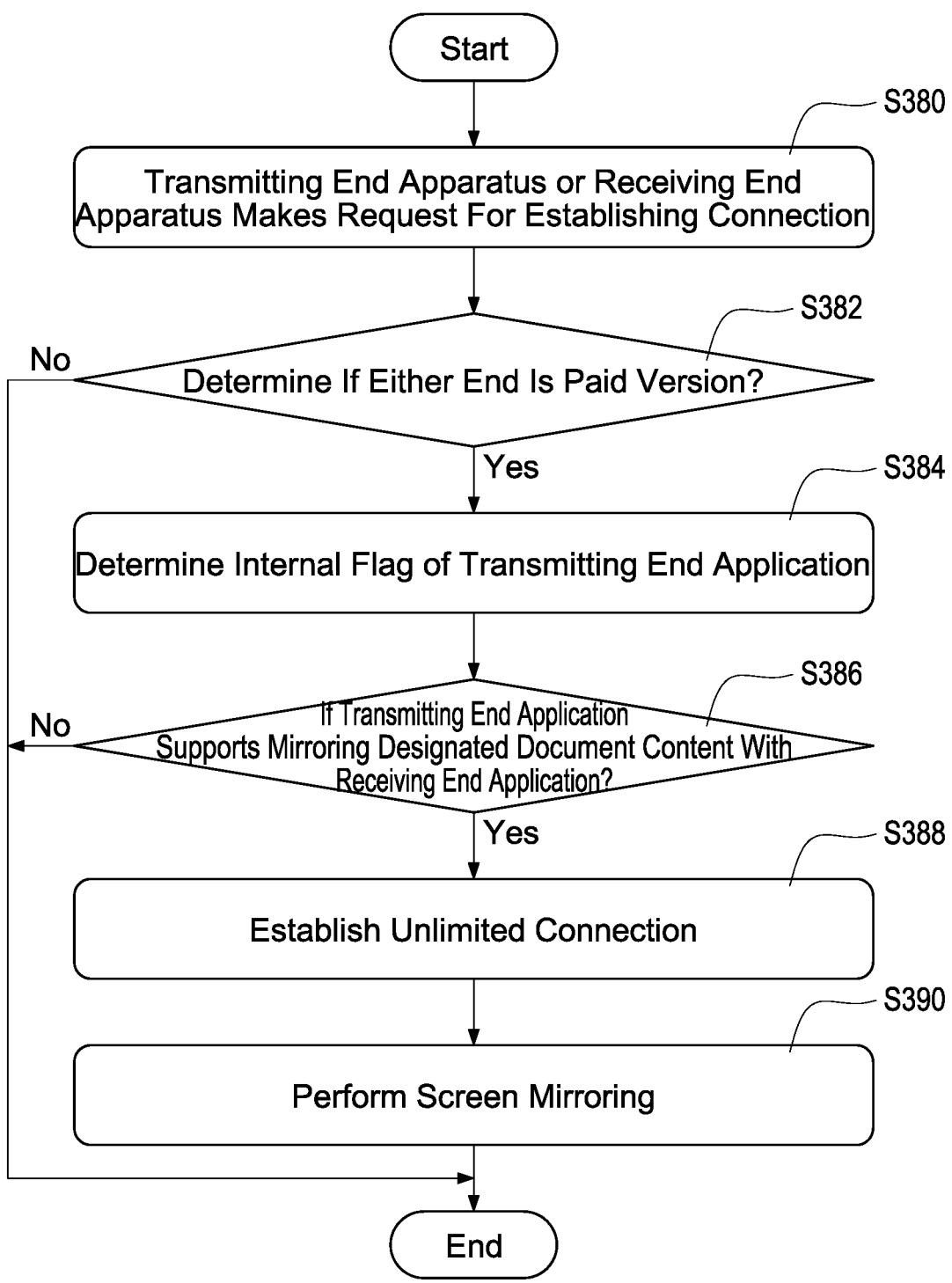
FIG. 7 is a first flow chart of the fourth preferred embodiment according to the present invention.

FIG. 7 is a first flow chart of the other preferred embodiment according to the present invention. First, a request for establishing a connection is made by the transmitting end apparatus 1 or the receiving end apparatus 2 (step S380), wherein the step S380 can be executed automatically or manually. In the embodiment, the receiving end application 20 determines if one of the transmitting end application 10 and the receiving end application 20 is a paid version according to the aforementioned step (step S382). If the transmitting end application 10 and the receiving end application 20 are both free versions, then the transmitting end apparatus 1 and the receiving end apparatus 2 are not able to establish a connection or can only establish a limited connection and perform screen mirroring as shown in the FIG. 5. If one of the transmitting end application 10 and the receiving end application 20 is a paid version, then the receiving end application 20 further determines an internal flag of the transmitting end application 10 (step S384), wherein the content of the flag is used for determining if the transmitting end application 10 supports mirroring designated document content with the receiving end application 20 (step S386).

If the transmitting end application 10 is not able to support mirroring the designated document content with the receiving end application 20, then the transmitting end apparatus 1 and the receiving end apparatus 2 are not able to establish a connection, or can only establish a limited connection and perform screen mirroring as shown in the embodiment in the FIG. 5. On the other hand, if the transmitting end application 10 supports mirroring the designated document content with the receiving end application 20, then the transmitting end apparatus 1 and the receiving end apparatus 2 establish an unlimited connection (step S388). Also, performs screen mirroring after the connection is established successfully (step S390), wherein the receiving end application 20 receives the designated document content from the transmitting end application 10, and displays the designated document content on the screen of the receiving end apparatus 2.

The characteristic of the present invention is that the determining mechanism of establishing a connection is executed by the transmitting end application 10 or the receiving end application 20 for confirming that the transmitting end apparatus 1 and the receiving end apparatus 2 are able to establish a limited connection, an unlimited connection or are not able to establish a connection before two screen mirroring applications establish a connection. Among which, the determining mechanism comprises but is not limited thereto: 1. whether the transmitting end application 10 is a paid version or a free version; 2. whether the receiving end application 20 is a paid version or a free version; 3. if the transmitting end application 10 supports the operating system used by the receiving end apparatus 2; 4. if the receiving end application 20 supports the operating system used by the transmitting end apparatus 1; 5. if the receiving end application 20 supports mirroring designated document content from the transmitting end application 10; and 6. if the transmitting end application 10 supports mirroring designated document content to the receiving end application 20.

As detailed above, some manufacturers may purchase many transmitting end applications 10 or receiving end applications 20, embed the aforementioned applications in their products for sale based on marketing strategies and sign product license agreement with application developers based on specific operating systems. Yet, the manufacturers may change the marketing strategies after signing the product license agreement. The method of the present invention provide the means to adjust the usage authority of the paid transmitting end application 110/the paid receiving end application 210 by the application developers when updating the paid transmitting end application 110/the paid receiving end application 210 is difficult (for example, the paid transmitting end application 110/the paid receiving end application 210 are firmware installed in the products).

Figure 8:
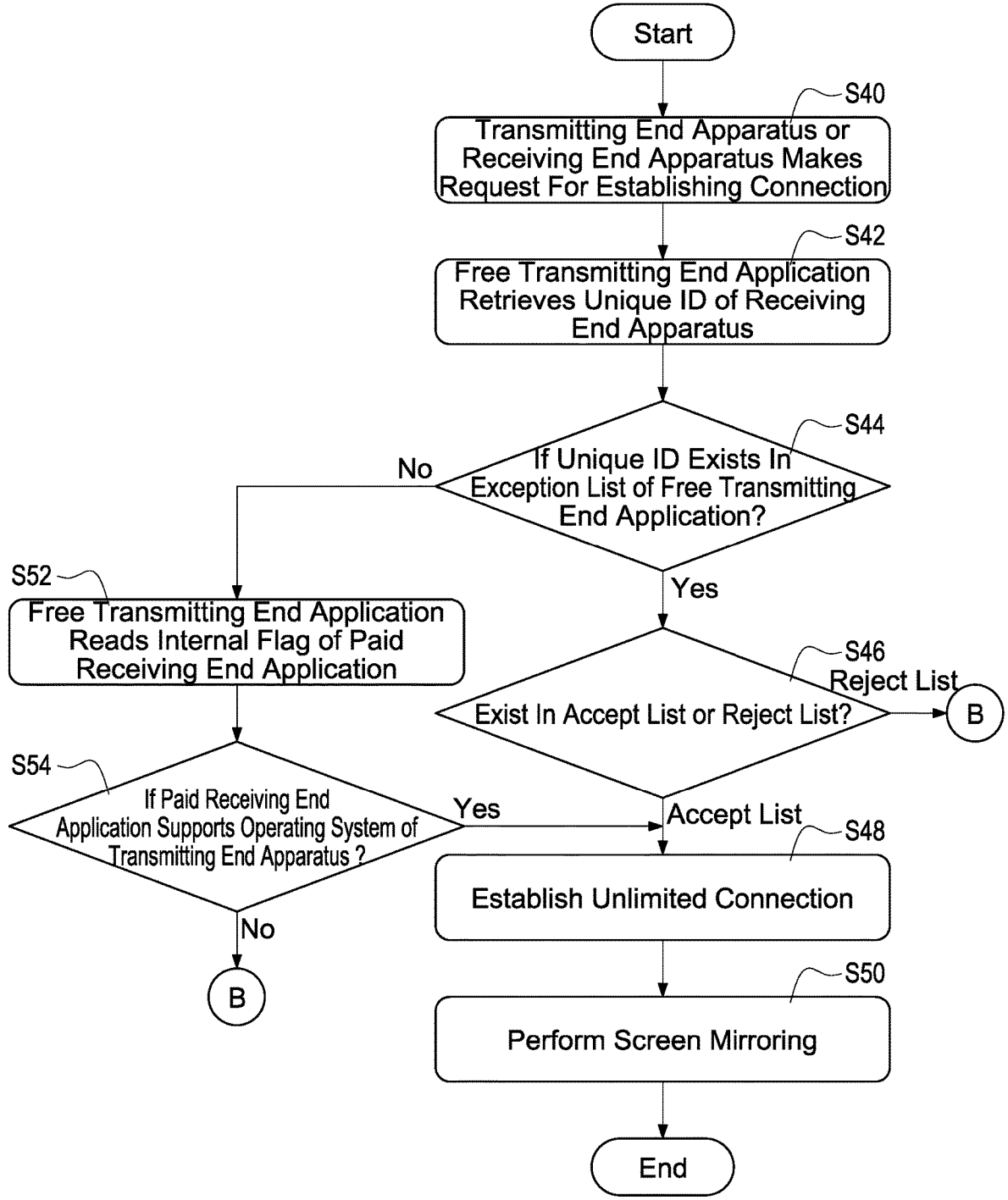
FIG. 8 is a first flow chart of the fifth preferred embodiment according to the present invention.

FIG. 8 is a first flow chart of the fifth preferred embodiment according to the present invention. In the embodiment shown in FIG. 8, the transmitting end apparatus 1 is installed with the free transmitting end application 120, and the receiving end apparatus 2 is installed with the paid receiving end application 210.

First, a request for establishing a connection is made by the transmitting end apparatus 1 or the receiving end apparatus 2 (step S40), wherein the step S40 can be executed manually by a user or executed automatically by either one of the apparatuses 1, 2. Next, the free transmitting end application 120 retrieves a unique ID of the receiving end apparatus 2 from the paid receiving end application 210 (step S42), and determines if the unique ID of the receiving end apparatus 2 exists in an exception list of the free transmitting end application 120 (step S44). Specifically, in step S44, the free transmitting end application 120 executes an internal inspection operation (i.e., checking the exception list recorded in the free transmitting end application 120) in order to determine if the transmitting end apparatus 1 and the receiving end apparatus 2 are able to establish a limited connection or an unlimited connection. The aforementioned unique ID for example is the device code of the receiving end apparatus 2, the MAC address of the Bluetooth unit of the receiving end apparatus 2, but the scope is not limited thereto.

If the free transmitting end application 120 determines the unique ID of the receiving end apparatus 2 exists in the exception list, the free transmitting end application 120 further determines if the unique ID exists in an accept list or in a reject list of the exception list (step S46). In the embodiment, the transmitting end apparatus 1 and the receiving end apparatus 2 establish an unlimited connection when the unique ID of the receiving end apparatus 2 is determined existing in the accept list of the free transmitting end application 120 (step S48), and screen mirroring is performed after a connection is established (step S50). When the unique ID of the receiving end apparatus 2 is determined existing in the reject list of the free transmitting end application 120, the flow moves back to the steps shown in the FIG. 5 as illustrated in the previous embodiment and is not elaborated hereto.

It should be note that, the exception list of in the embodiment is created via updating the free transmitting end application 120 by the application developers after signing the product license agreement and the content of the exception list corresponds to the amendments made in the product license agreement. Accordingly, the priority of the exception list in the embodiment is higher than the priority of the aforementioned flag.

Specifically, if the unique ID of the receiving end apparatus 2 exists in the accept list of the free transmitting end application 120, the free transmitting end application 120 is not required to determine if the paid receiving end application 210 in the receiving end apparatus 2 supports the operating system used by the transmitting end apparatus 1 (i.e., is not required to read the internal flag of the paid receiving end application 210 meaning the free transmitting end application 120 is not required to determine if the paid receiving end application 210 makes payment based on the operating system used by the transmitting end apparatus 1), and the apparatuses 1 and 2 establish an unlimited connection. On the other hand, if the unique ID of the receiving end apparatus 2 exists in the reject list of the free transmitting end application 120, the free transmitting end application 120 also is not required to determine if the paid receiving end application 210 in the receiving end apparatus 2 supports the operating system used by the transmitting end apparatus 1, and the apparatuses 1 and 2 only establish a limited connection or do not establish a connection at all.

In step S44, if the free transmitting end application 120 determines the unique ID of the receiving end apparatus 2 does not exist in the exception list (i.e., neither exists in the accept list nor the reject list), then the free transmitting end application 120 further reads the internal flag in the paid receiving end application 210 (step S52) to determine if the paid receiving end application 210 supports the operating system used by the transmitting end apparatus 1 (step S54). Specifically, in step S52, the free transmitting end application 120 executes an external inspection operation (i.e., checking the flag recorded in the paid receiving end application 210) in order to determine if the transmitting end apparatus 1 and the receiving end apparatus 2 are able to establish a limited connection or an unlimited connection.

If the paid receiving end application 210 supports the operating system used by the transmitting end apparatus 1, the free transmitting end application 120 executes the aforementioned step S48 and S50 to establish an unlimited connection between the transmitting end apparatus 1 and the receiving end apparatus 2, and screen mirroring is performed after a connection is established. When the receiving end apparatus 210 does not support the operating system used by the transmitting end apparatus 1, the flow moves back to the steps shown in the FIG. 5 as illustrated in the previous embodiment and is not elaborated hereto.

Two user scenarios are illustrated below to better elaborate the aforementioned exception list:

User Scenario One:

A manufacture of setup boxes signs a product license agreement with an application developer based on a paid receiving end application 210 with supports on certain operating systems (for example paying for supporting Windows and Mac OS operating systems but not supporting Android and iOS operating systems). When a connection is established between two apparatuses, the free transmitting end application 120 reads the flag of the paid receiving end application 210 which indicates the paid receiving end application 210 only supports the transmitting end apparatus 1 using a Windows and a Mac OS operating systems.

After the setup boxes are available in the market, the manufacturer decides to change the marketing strategy to provide extra service to setup box users so that the users are allowed to perform screen mirroring to the paid receiving end application 210 with the transmitting end apparatus 1 using Android and iOS operating systems. Under the user scenario, the paid receiving end application 210 may be a firmware of the setup boxes and the free transmitting end application 120 may be an application in a smart phone. Generally, updating a firmware of a setup box can be difficult tasks to users, yet updating applications in a smart phone is not. Accordingly, the application developer adds the unique ID of the setup boxes to a accept list of the free transmitting end application 120 via updating the free transmitting end application 120. Thus, the paid receiving end application 210 is deemed supporting the operating system, which is not recorded in the internal flag, based on the accept list of the free transmitting end application 120, without making amendments to the internal flag of the paid receiving end application 210.

User Scenario Two:

A manufacture of setup boxes signs a product license agreement with an application developer based on a paid receiving end application 210 with supports on all operating systems. Therefore, the paid receiving end application 210 supports all transmitting end apparatus 1 that use all operating systems. Yet, the manufacturers do not want to continue to pay the royalties of the paid receiving end application 210 upon the license period listed in the product license agreement expires. Accordingly, the application developer adds the unique ID of the setup boxes to a reject list of the free transmitting end application 120 via updating the free transmitting end application 120. Thus, the paid receiving end application 210 is deemed not supporting part or all of the operating systems recorded in the internal flag based on the reject list of the free transmitting end application 120, without making amendments to the internal flag of the paid receiving end application 210. Consequently, the application developer uses the method to assure the manufacturers complying with the product license agreement signed between two parties without compromising the rights of the application developer.

Specifically, an example illustrating the usage of the exception list is shown as follows:

| Payment status | Exception list | Connection status | Potential causes |
| --- | --- | --- | --- |
| Paid | The unique ID does not exist | Establish an unlimited connection | Comply with the payment based product license agreement |
| Not paid | The unique ID does not exist | Establish a limited connection | Comply with the free product license agreement |
| Paid | The unique ID exists in the accept list | Establish an unlimited connection | Signed the payment based product license agreement, then paid extra cost to support all operating systems |
| Paid | The unique ID exists in the reject list | Establish a limited connection | Does not comply with the product license agreement |
| Not paid | The unique ID exists in the accept list | Establish an unlimited connection | Signed the free product license agreement, then paid extra cost to support all operating systems |
| Not paid | The unique ID exists in the reject list | Establish a limited connection | Signed the free product license agreement, then paid extra cost to support all operating systems, but does not comply with the product license agreement afterwards |

In the embodiment shown in FIG. 8, the free transmitting end application 120 is used to determine if the unique ID of the receiving end apparatus 2 exists in the exception list and determine if the paid receiving end application 210 supports the operating system used by the transmitting end apparatus 1. Though, it should be noted that the above determining mechanism can be executed by the receiving end application 20 in other embodiments.

Figure 9:
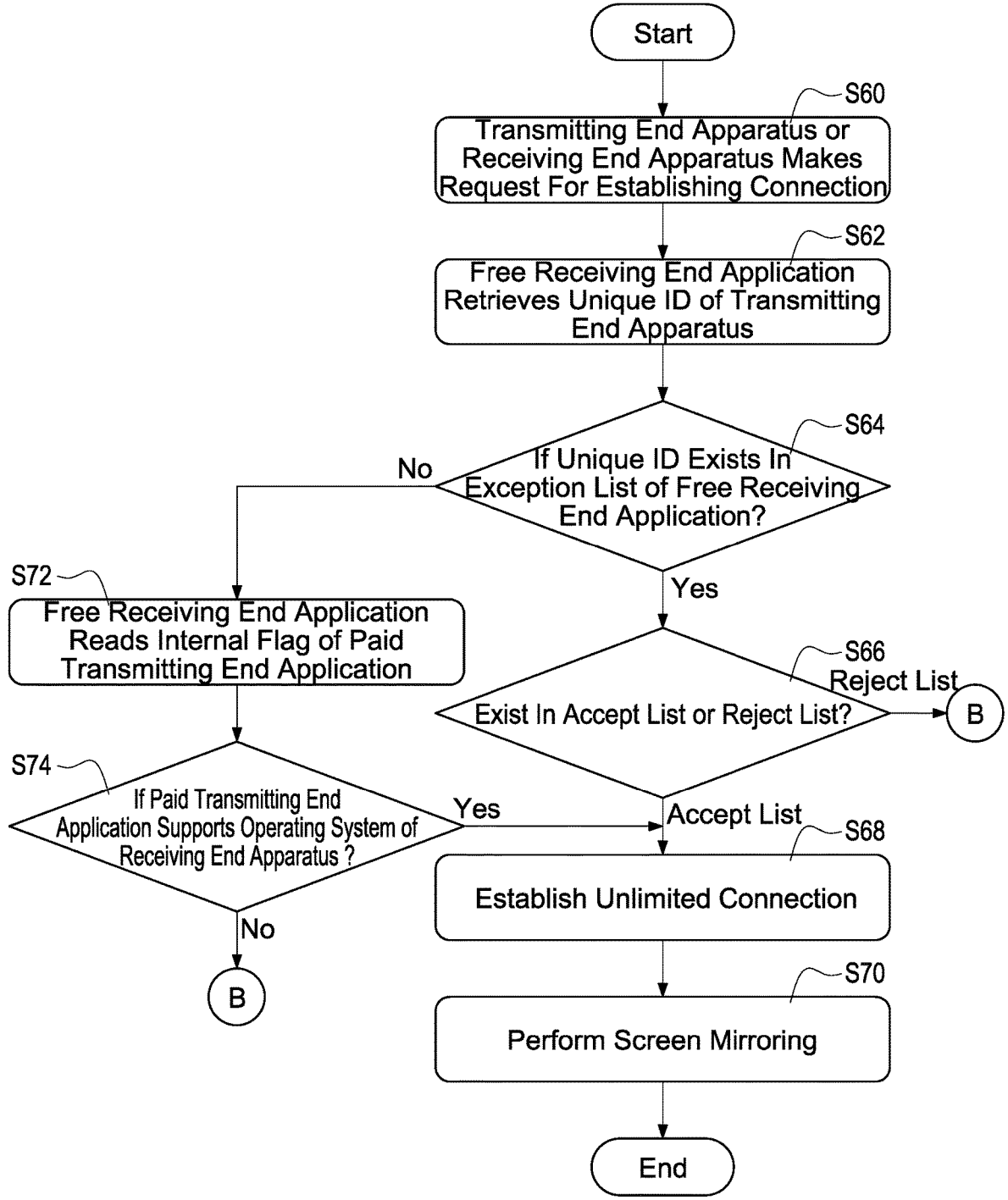
FIG. 9 is a first flow chart of the sixth preferred embodiment according to the present invention.

FIG. 9 is a first flow chart of the sixth preferred embodiment according to the present invention. In the embodiment shown in FIG. 9, the transmitting end apparatus 1 is installed with the paid transmitting end application 110, and the receiving end apparatus 2 is installed with the free receiving end application 220. In the embodiment, the aforementioned manufacturers signed product license agreement based on the operating systems supported by the paid transmitting end application 110, and embeds the paid transmitting end application 110 in the transmitting end apparatus 1 (such as a smart phone, a tablet).

First, a request for establishing a connection is made by the transmitting end apparatus 1 or the receiving end apparatus 2 (step 60). Next, the free receiving end application 220 retrieves a unique ID of the transmitting end apparatus 1 from the paid transmitting end application 110 (step S62), and determines if the unique ID of the transmitting end apparatus 1 exists in an exception list of the free receiving end application 220 (step S64).

If the free receiving end application 220 determines the unique ID of the transmitting end apparatus 1 exists in the exception list, the free receiving end application 220 further determines if the unique ID exists in an accept list or in a reject list of the exception list (step S66). Similarly, the transmitting end apparatus 1 and the receiving end apparatus 2 establish an unlimited connection when the unique ID of the transmitting end apparatus 1 exists in the accept list of the free receiving end application 220 (step S68), and screen mirroring is performed after a connection is established (step S70). When the unique ID of the transmitting end apparatus 1 exists in the reject list, the flow moves back to the steps shown in the FIG. 5 as illustrated in the previous embodiment and is not elaborated hereto.

In step S64, if the free receiving end application 220 determines the unique ID of the transmitting end apparatus 1 does not exist in the exception list, then the free receiving end application 220 further reads the internal flag in the paid transmitting end application 110 (step S72) to determine if the paid transmitting end application 110 supports the operating system used by the receiving end apparatus 2 (step S74). If the paid transmitting end application 110 supports the operating system used by the receiving end apparatus 2, the free receiving end application 220 executes the aforementioned step S68 and S70 to establish an unlimited connection between the transmitting end apparatus 1 and the receiving end apparatus 2, and screen mirroring is performed after a connection is established. If the transmitting end apparatus 110 does not support the operating system used by the receiving end apparatus 2, the flow moves back to the steps shown in the FIG. 5 as illustrated in the previous embodiment and is not elaborated hereto.

With the steps shown in FIG. 8 and FIG. 9, the method of the present invention adjusts the operating systems supported by the paid applications via creating an exception list in the free applications when the internal flags of the paid applications cannot be updated. Thus, users are effectively encouraged to comply with application license agreements signed with application developers based on the paid applications and the right of application developers is protected.

As the skilled person will appreciate, various changes and modifications can be made to the described embodiment. It is intended to include all such variations, modifications and equivalents which fall within the scope of the present invention, as defined in the accompanying claims.

What is claimed is:

1. A method of establishing a paid connection using a screen mirroring application between multi-platforms, the method used between a transmitting end apparatus of a sharing source and a receiving end apparatus of a sharing target, wherein the transmitting end apparatus being installed with a free transmitting end application, the receiving end apparatus being installed with a paid receiving end application, the method of establishing a paid connection comprising:
   a) making a request to establish a connection between the transmitting end apparatus and the receiving end apparatus;

b) the free transmitting end application receiving a unique ID of the receiving end apparatus from the paid receiving end application;
c) the free transmitting end application executing an internal inspection operation to determine if the unique ID exists in an exception list in the free transmitting end application;
d) the free transmitting end application reading a flag in the paid receiving end application to execute an external inspection operation if the unique ID does not exist in the exception list;
e) determining if the paid receiving end application supports an operating system used by the transmitting end apparatus according to the flag;
f) the transmitting end apparatus and the receiving end apparatus establishing an unlimited connection when it is determined that the operating system used by the transmitting end apparatus is supported by the paid receiving end application via the flag; and
g) the transmitting end apparatus performing screen image mirroring via a network system and displaying the mirrored screen image on a screen of the receiving end apparatus following step f.

2. The method of establishing a paid connection using a screen mirroring application between multi-platforms of claim 1, wherein step e is determining if the paid receiving end application makes payment based on the operating system used by the transmitting end apparatus according to the content of the flag, wherein the paid receiving application is determined to be supportable by the operating system of the transmitting end apparatus when the paid receiving end application makes payment based on the operating system of the transmitting end apparatus, and the paid receiving end application is determined to be unsupportable by the operating system of the transmitting end apparatus when the paid receiving end application does not make payment based on the operating system of the transmitting end apparatus.

3. The method of establishing a paid connection using a screen mirroring application between multi-platforms of claim 2, further comprising the following steps:
h) if the unique ID exists in the exception list following step c, the free transmitting end application determining if the unique ID exists in an accept list or in a reject list of the exception list;
i) the transmitting end apparatus and the receiving end apparatus establishing an unlimited connection when the unique ID exists in the accept list of the free transmitting end application; and
j) the transmitting end apparatus performing screen image mirroring via a network system and displaying the mirrored screen image on the screen of the receiving end apparatus following step i.

4. The method of establishing a paid connection using a screen mirroring application between multi-platforms of claim 3, further comprising the following steps:
k) the transmitting end apparatus and the receiving end apparatus establishing a limited connection when the unique ID exists in the reject list of the free transmitting end application;
l) the transmitting end apparatus performing screen image mirroring via a network system and displaying the mirrored screen image on the screen of the receiving end apparatus following step k;
m) determining if the connection between the transmitting end apparatus and the receiving end apparatus is under a limit condition following step l; and
n) limiting the connection between the transmitting end apparatus and the receiving end apparatus if the connection between the transmitting end apparatus and the receiving end apparatus is under the limit condition.

5. The method of establishing a paid connection using a screen mirroring application between multi-platforms of claim 2, further comprising the following steps:
o) the transmitting end apparatus and the receiving end apparatus establishing a limited connection when it is determined that the paid receiving end application is unsupportable by the operating system used by the transmitting end apparatus via the flag;
p) the transmitting end apparatus performing screen image mirroring via a network system and displaying the mirrored screen image on the screen of the receiving end apparatus following step o;
q) determining if the connection between the transmitting end apparatus and the receiving end apparatus is under a limit condition following step p; and
r) limiting the connection between the transmitting end apparatus and the receiving end apparatus if the connection between the transmitting end apparatus and the receiving end apparatus is under the limit condition.

6. The method of establishing a paid connection using a screen mirroring application between multi-platforms of claim 5, wherein the limit condition is a limit of the connection time.

7. The method of establishing a paid connection using a screen mirroring application between multi-platforms of claim 5, wherein the step r is forcibly disconnecting the connection between the transmitting end apparatus and the receiving end apparatus.

8. The method of establishing a paid connection using a screen mirroring application between multi-platforms of claim 5, wherein the step r is displaying a charge reminder message on a screen of the transmitting end apparatus and the screen of the receiving end apparatus.

9. A method of establishing a paid connection using a screen mirroring application between multi-platforms, the method used between a transmitting end apparatus of a sharing source and a receiving end apparatus of a sharing target, wherein the transmitting end apparatus being installed with a paid transmitting end application, the receiving end apparatus being installed with a free receiving end application, the method of establishing a paid connection comprising:
a) making a request to establish a connection between the transmitting end apparatus and the receiving end apparatus;
b) the free receiving end application receiving a unique ID of the transmitting end apparatus;
c) the free receiving end application executing an internal inspection operation to determine if the unique ID exists in an exception list in the free receiving end application;
d) the free receiving end application reading a flag in the paid transmitting end application to execute an external inspection operation if the unique ID does not exist in the exception list;
e) determining if the paid transmitting end application supports an operating system used by the receiving end apparatus;
f) the transmitting end apparatus and the receiving end apparatus establishing an unlimited connection when it is determined that the operating system used by the receiving end apparatus is supported by the paid transmitting end application via the flag; and g) the receiving end apparatus receiving screen image mirrored from the transmitting end apparatus via a network system and displaying the mirrored screen image on a screen of the receiving end apparatus following step f.

10. The method of establishing a paid connection using a screen mirroring application between multi-platforms of claim 9, wherein step e is determining if the paid transmitting end application makes payment based on the operating system used by the receiving end apparatus according to the content of the flag, wherein the paid transmitting end application is determined to be supportable by the operating system of the receiving end apparatus when the paid transmitting end application makes payment based on the operating system of the receiving end apparatus, and the paid transmitting end application is determined to be unsupportable by the operating system of the receiving end apparatus when the paid transmitting end application does not make payment based on the operating system of the receiving end apparatus.

11. The method of establishing a paid connection using a screen mirroring application between multi-platforms of claim 10, further comprising the following steps:
   h) if the unique ID exists in the exception list following step c, the free receiving end application determining if the unique ID exists in an accept list or in a reject list of the exception list;
   i) the transmitting end apparatus and the receiving end apparatus establishing an unlimited connection when the unique ID exists in the accept list of the free receiving end application; and
   j) the receiving end apparatus receiving screen image mirrored from the transmitting end apparatus via a network system and displaying the mirrored screen image on the screen of the receiving end apparatus.

12. The method of establishing a paid connection using a screen mirroring application between multi-platforms of claim 11, further comprising the following steps:
   k) the transmitting end apparatus and the receiving end apparatus establishing a limited connection when the unique ID exists in the reject list of the free receiving end application;
   l) the receiving end apparatus receiving screen image mirrored from the transmitting end apparatus via a network system and displaying the mirrored screen image on the screen of the receiving end apparatus following step k;
   m) determining if the connection between the transmitting end apparatus and the receiving end apparatus is under a limit condition following step l; and
   n) limiting the connection between the transmitting end apparatus and the receiving end apparatus if the connection between the transmitting end apparatus and the receiving end apparatus is under the limit condition.

13. The method of establishing a paid connection using a screen mirroring application between multi-platforms of claim 10, further comprising the following steps:
   o) the transmitting end apparatus and the receiving end apparatus establishing a limited connection when it is determined that the paid transmitting end application is unsupportable by the operating system used by the receiving end apparatus via the flag;
   p) the receiving end apparatus receiving screen image mirrored from the transmitting end apparatus via a network system and displaying the mirrored screen image on the screen of the receiving end apparatus following step o;
   q) determining if the connection between the transmitting end apparatus and the receiving end apparatus is under a limit condition following step p; and
   r) limiting the connection between the transmitting end apparatus and the receiving end apparatus if the connection between the transmitting end apparatus and the receiving end apparatus is under the limit condition.

14. The method of establishing a paid connection using a screen mirroring application between multi-platforms of claim 13, wherein the limit condition is a limit of the connection time.

15. The method of establishing a paid connection using a screen mirroring application between multi-platforms of claim 13, wherein the step r is forcibly disconnecting the connection between the transmitting end apparatus and the receiving end apparatus.

16. The method of establishing a paid connection using a screen mirroring application between multi-platforms of claim 13, wherein the step r is displaying a charge reminder message on a screen of the transmitting end apparatus and the screen of the receiving end apparatus.

* * * * *